Jan. 11, 1949.   M. L. GREENOUGH   2,458,701
SHADED POLE MOTOR CONTROL
Filed Nov. 20, 1945
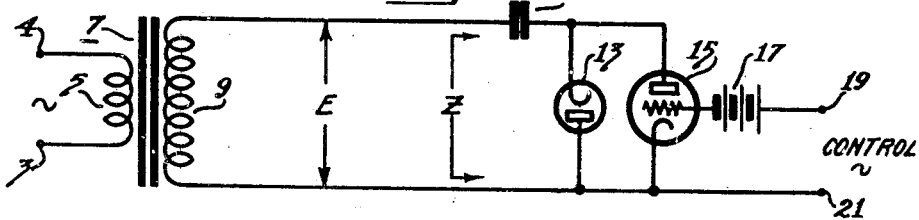
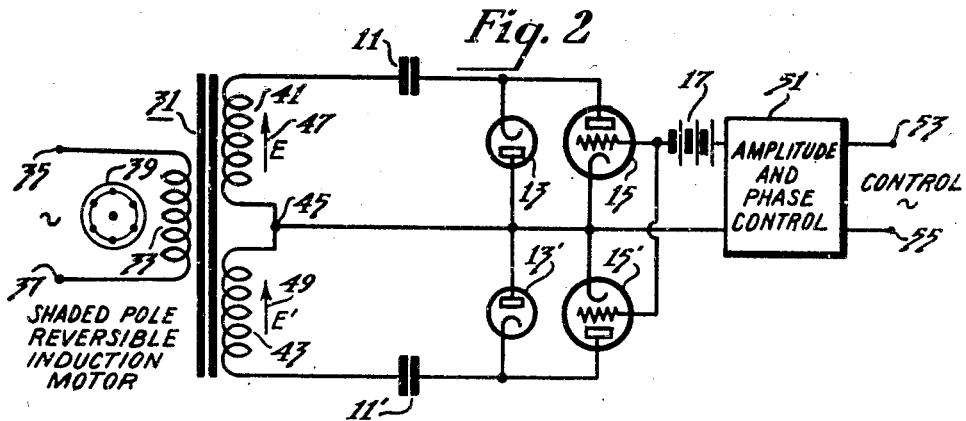
INVENTOR.
Maurice L. Greenough
BY
ATTORNEY Patented Jan. 11, 1949

2,458,701

UNITED STATES PATENT OFFICE 2,458,701

SHADED POLE MOTOR CONTROL

Maurice Leighton Greenough, Groveland, Mass., assignor to Radio Corporation of America, a corporation of Delaware Application November 20, 1945, Serial No. 629,900

11 Claims. (Cl. 318—208)

This invention relates generally to variable impedance electrical networks and more particularly to an improved method of and means for varying electrically the impedance of a load circuit in response to an applied potential.

Numerous variable impedance load and control circuits have been employed heretofore which utilize thermionic tubes as variable reactive or impedance network elements. The instant invention comprises a novel thermionic tube variable impedance network wherein a diode and a triode are connected in parallel in opposite polarity and are connected in series with a capacitor and a load circuit to be controlled. A feature of the circuit is that effectively full wave impedance control may be obtained by applying suitable potentials to the control grid electrode of the triode thermionic tube.

Briefly in its simplest form, the network described heretofore, may be employed for increasing or decreasing the effective loading of an alternating potential circuit in response to the phase and magnitude of a second alternating control potential. The load circuit provides an alternating potential which is applied through the capacitor to the oppositely polarized thermionic tubes. A fixed D.-C. bias voltage applied to the grid electrode of the triode determines the maximum impedance of the load. The alternating potential applied to the triode grid may be varied in phase and magnitude to control the load impedance within the preselected limiting values. The circuit may be employed, for example, to control the loading of a shading winding of a shaded-pole induction servomotor.

A preferred embodiment of the circuit according to the invention provides a control circuit for a reversible shaded-pole induction servomotor whereby differential loading of two shading windings permits the motor to be operated in opposite directions to a degree determined by the phase and magnitude of a single applied alternating control potential. Briefly, the circuit comprises two networks of the type described heretofore wherein the thermionic tubes of each network are energized from separate ones of the motor shading windings. The grid electrodes of the triode thermionic tubes are connected together and are biased by a predetermined D.-C. potential to provide the desired motor damping. The control alternating potential is applied to the triode grid circuits through amplitude and phase controls, whereby the degree and direction of rotation of the motor may be determined in response to the applied alternating potential. The shading windings of the motor are connected in series. Since the anodes of the two triodes have opposite instantaneous phase, the loading of the shading windings will depend upon the phase of the control potential applied to the triode grid electrodes. If grid and anode voltages are of the same polarity, the conductance of the triode is a maximum value determined by the fixed D.-C. bias. Grid and anode voltages of opposite polarity reduce the tube conductance, and hence reduce the loading on the corresponding shading winding. Reduction of the loading of either shading winding causes an increase in the loading of the other shading winding, with the result that the motor will rotate in a direction and to an extent determined by the phase and magnitude of the applied alternating potential. With no applied alternating control potential, the shading windings are equally loaded with the result that the motor field is in equilibrium. The D.-C. bias applied to the grid electrodes of the triodes is selected to provide the desired damping of the motor shading windings. This damping is effectively removed when an alternating control signal is applied to the circuit.

Accordingly one of the objects of the invention is to provide an improved method of and means for varying the impedance of an electrical network in response to the phase and magnitude of an applied alternating potential. Another object is to provide an improved method of and means for controlling the degree and direction of rotation of a servomotor in response to the magnitude and phase of an applied alternating potential. A further object of the invention is to provide an improved electrical network for controlling the shading windings of a shaded-pole induction motor in response to the phase and magnitude of an applied potential. An additional object is to provide an improved electrical circuit providing effectively full wave control of a load impedance in response to a single applied potential. A further object is to provide an improved full wave servomotor control circuit for controlling simultaneously the loading of two shading windings of a reversible shaded-pole induction servomotor in response to the phase and magnitude of a single applied control potential. Another object is to provide an improved servomotor control circuit including electronic means for heavily damping the motor operation in the absence of an applied control potential. A still further object is to provide an improved servomotor control circuit having high starting torque with heavy damping as the motor circuit approaches equilibrium. Another object is to provide an improved servomotor control circuit having high loop-gain and great stability.

The invention will be described in greater detail by reference to the accompanying drawing of which Figure 1 is a schematic circuit diagram of a basic embodiment of the invention, and Figure 2 is a schematic circuit diagram of a preferred embodiment of the invention adapted to control a reversible shaded-pole induction servomotor. Similar reference characters are applied to similar elements throughout the drawing.

Referring to Figure 1, a source of alternating potential, not shown, is connected to input terminals 4, 3, terminating the primary winding 5 of a transformer 7 having a secondary winding 9 coupled thereto. One terminal of the secondary winding 9 is connected through a relatively large capacitor 11 to the cathode of a diode thermionic tube 13 and to the anode of a triode thermionic tube 15. The remaining terminal of the secondary winding 9 is connected to the anode of the diode 13 and to the cathode of the triode 15. The control grid electrode of the triode 15 is connected to a source of D.-C. bias potential such, for example, as a battery 17. A source of alternating control potential, not shown, is connected to control input terminals 19 and 21 which are connected, respectively, to the bias battery 17 and to the cathode of the triode 15.

The diode 13 is conducting on negative half cycles of the alternating potential E developed across the secondary winding 9, while the triode 15 can conduct only on positive half cycles of said potential. Furthermore the conduction of the triode is determined by the magnitude of the grid voltage. Due to the series capacitor 11 there can be no direct current flowing through the secondary winding 9. Therefore, the uncontrolled diode current cannot exceed that of the controlled triode current. The bias voltage applied to the grid of the triode may be D.-C., as illustrated, or may be an alternating potential of the same frequency as the applied anode potential. In the latter instance a synchronous bias action results. If the control alternating potential applied to the terminals 19, 21, is of the same instantaneous polarity to that of the potential E, applied to the triode anode, the conduction of the thermionic tubes reaches a maximum value determined by the preselected bias voltage. A control potential of opposite instantaneous polarity reduces the conduction of the thermionic tubes to a minimum value. The conductance of the thermionic tubes determines the effective loading impedance Z which is effectively shunted across the secondary winding 9 and hence which is reflected to the input terminals 4, 3.

It should be understood that a tetrode, pentode or other multi-grid tube may be substituted for the triode 15.

In the circuit of Figure 2, a reversible shaded-pole induction motor, 31, of the type commonly employed in the servo systems, includes an input winding 33 connected to input terminals 35, 37, coupled to a source of alternating potential, not shown. The motor includes a squirrel cage rotor element 39 and a pair of shading windings 41 and 43 which are connected in series and coupled to the input winding 33. The common terminal 45 of the shading windings 41 and 43 is connected to the anodes of a pair of diode thermionic tubes 13, 13', and to the cathodes of a pair of triode thermionic tubes 15, 15'. The remaining terminal of the first shading winding 41 is connected through a first capacitor 11 to the cathode of the diode 13 and to the anode of the triode 15. Similarly, the remaining terminal of the second shading winding 43 is connected through a second capacitor 11' to the cathode of the diode 13' and to the anode of the triode 15' whereby instantaneous potentials E and E', of opposite polarity as indicated by the arrows 47 and 49, are applied to the thermionic tube anode-cathode circuits.

The control grid electrodes of the triodes 15 and 15' are connected together and are coupled through a source of D.-C. bias potential 17 to the output of an amplitude and phase control 51. A source of alternating control potential is connected to control input terminals 53, 55 which are coupled through the amplitude and phase control 51 to actuate the grid circuits of the triodes 15 and 15'.

Each of the shading winding circuits including the corresponding series capacitor and the shunt-connected diode and triode are substantially identical to the circuit described heretofore by reference to Figure 1 of the drawing. Since the two shading winding circuits have opposite instantaneous phase, a control potential applied to the input terminals 53 and 55 will increase the loading upon one of the shading windings and simultaneously will decrease the loading upon the other of the shading windings. Thus the phase and magnitude of the applied alternating control potential will determine the direction and degree of rotation of the servomotor. The magnitude of the bias voltage source 17 normally is adjusted to provide considerable loading on both shading windings in the absence of an alternating control potential. The equal loading of both shading windings provides relatively heavy damping of the motor which is removed when an alternating control signal is applied to the circuit. This feature results in improved motor stopping characteristics while starting torque is unimpaired.

An addditional feature of the circuit operation is that sudden changes in the control potential provide D.-C. surges as the capacitors charge, thereby increasing the damping. Motor stopping time is further reduced, although some starting delay is encountered. With the preferred servomotor control circuit described, it has been found that the system loop-gain may be increased as much as four or five times that of known servo control systems without self-oscillation of the servo control circuit.

Thus the invention disclosed comprises an improved electronic variable impedance and a highly efficient and stable servomotor control circuit providing full control of a reversible shaded-pole induction servomotor having high electrical damping and high starting torque.

I claim as my invention:

1. An electronic variable impedance network including a first source of alternating potential, a pair of thermionic tubes parallel connected in opposite polarity, a capacitor in series with said tubes, said tubes and said series capacitor being in shunt with said first source, a second source of alternating potential, unidirectional bias voltage means for said one of said tubes for establishing a loading control limit, and means connecting said second source to one of said tubes to vary simultaneously the conductance of both of said tubes to vary the loading of said first source.

2. Apparatus according to claim 1 including means for adjusting the phase and magnitude of said second source of alternating potential to control said loading of said first source.

3. A control circuit for a shaded-pole induction servomotor having a shading winding including a first source of alternating potential coupled to said motor and said winding, a pair of thermionic tubes parallel connected in opposite polarity, a capacitor in series with said tubes, said tubes and said series capacitor being connected in shunt with said winding, a second source of alternating potential, unidirectional bias voltage means for said one of said tubes for establishing a loading control limit, and means connecting said second source to one of said tubes to vary simultaneously the conductance of both of said tubes to vary the loading of said shading winding and the rotation of said motor.

4. A control circuit for a reversible shaded-pole induction servomotor having a pair of serially-connected shading windings including a first source of alternating potential coupled to said motor and to said windings, two pairs of thermionic tubes, the tubes of each of said pairs being parallel connected in opposite polarity, capacitors in series with each of said windings and different pairs of said tubes, a second source of alternating potential, and means connecting said second source of potential simultaneously to one tube of each of said pairs of tubes to vary simultaneously the conductance of all of said tubes for varying in opposite sense the loading of said shading windings and for controlling the rotation of said motor.

5. Apparatus according to claim 3 including means for adjusting the phase and magnitude of said second source of alternating potential to control the degree of said motor rotation.

6. Apparatus according to claim 3 including bias voltage means for said one of said tubes for electrically damping said motor in the absence of an applied voltage from said second source.

7. Apparatus according to claim 4 including means for adjusting the phase and magnitude of said second source of alternating potential to control respectively the direction and degree of rotation of said motor.

8. Apparatus according to claim 4 including bias voltage means for said one of said tubes of each of said pairs of tubes for electrically damping said motor in the absence of an applied voltage from said second source.

9. A control circuit for a shaded-pole induction servomotor having a shading winding including a first source of alternating potential coupled to said motor and said winding, a thermionic diode and a thermionic triode having their anode-cathode circuits connected in opposite polarity, a capacitor in series with said anode-cathode circuits of said tubes, said tubes and said series capacitor being connected in shunt with the said winding, a second source of alternating potential, unidirectional bias voltage means for one of said tubes for establishing loading control limits, and means connecting said second source to the grid-cathode circuit of said triode to varying simultaneously the conductance of both of said tubes to vary loading of said shading winding and the rotation of said motor.

10. A control circuit for a reversible shaded-pole induction servomotor having a pair of serially-connected shading windings including a first source of alternating potential coupled to said motor and to said windings, two pairs of thermionic tubes each including a thermionic diode and triode, the tubes of each of said pairs having their anode-cathode circuits parallel connected in opposite polarity, capacitors in series with each of said windings and different pairs of said tubes, a second source of alternating potential, and means connecting said second source of potential simultaneously to the grid-cathode circuits of said triodes of each of said pairs of tubes to vary simultaneously the conductance of all of said tubes for varying in opposite sense the loading of said shading windings and for controlling the rotation of said motor.

11. The method of utilizing a pair of thermionic tubes and a capacitor to provide a variable electronic impedance for a source of alternating potential comprising the steps of operating said tubes in shunt polarity opposition, applying said potential serially to said capacitor and said tubes, unidirectionally biasing one of said tubes for establishing an impedance control limit, and varying the conductance of one of said tubes to vary the loading of said source.

MAURICE LEIGHTON GREENOUGH.

REFERENCES CITED

The following references are of record in the file of this patent:

UNITED STATES PATENTS

| Number | Name | Date |
|---|---|---|
| 2,109,776 | Johnson | Mar. 1, 1938 |
| 2,351,759 | Grundmann | June 20, 1944 |

FOREIGN PATENTS

| Number | Country | Date |
|---|---|---|
| 587,525 | Germany | Nov. 4, 1933 |